United States Patent
Sato (10) Patent No.: US 6,560,369 B1
(45) Date of Patent: May 6, 2003

(54) CONVERSION OF WAVELET CODED FORMATS DEPENDING ON INPUT AND OUTPUT BUFFER CAPACITIES

(75) Inventor: Makoto Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/457,528

(22) Filed: Dec. 9, 1999

(30) Foreign Application Priority Data

Dec. 11, 1998 (JP) .......................................... 10-353012

(51) Int. Cl.⁷ .............................. G06K 9/36; G06K 9/46
(52) U.S. Cl. ........................................ 382/239; 382/240
(58) Field of Search ................................. 382/232, 239, 382/240, 248; 375/240.02, 240.1, 240.11, 240.18, 240.19, 240.24; 358/426.02, 426.04, 426.05, 426.06; 348/398.1, 420.1

(56) References Cited

U.S. PATENT DOCUMENTS 6,236,758 B1 * 5/2001 Sodagar et al. ............. 382/240
6,426,974 B2 * 7/2002 Takahashi et al. ...... 375/240.03

* cited by examiner

Primary Examiner—Timothy M. Johnson
(74) Attorney, Agent, or Firm—Fitzpatrick, Cella, Harper & Scinto (57) ABSTRACT

An optimum data arrangement is provided such that each apparatus can efficiently deal with image data encoded using discrete wavelet transform. For that purpose, an image processing apparatus includes an input device for inputting first entropy encoded data. The first entropy encoded data is obtained by peforming entropy encoding of transform coefficients of a first data arrangement. The transform coefficients of the first data arrangement are obtained by performing wavelet transform of a predetermined image in each first unit. The apparatus also includes an arrangement changing device for performing entropy decoding of the first entropy encoded data, and changing the obtained transform coefficients of the first data arrangement into transform coefficients of a second data arrangement obtained by performing wavelet transform of the predetermined image in each second unit, and an entropy encoder for generating second entropy encoded data by performing entropy encoding of the transform coefficients of the second data arrangement.

42 Claims, 8 Drawing Sheets

CONVERSION OF WAVELET CODED FORMATS DEPENDING ON INPUT AND OUTPUT BUFFER CAPACITIES

BACKGROUND OF THE INVENTION

1. Field of the Invention

The present invention relates to an image processing apparatus and method for encoding/decoding an image, and a storage medium storing this method.

2. Description of the Related Art

In accordance with recent remarkable developments in computers and networks, various kinds of sets of information, such as character data, image data, voice data and the like, are stored within a computer or transmitted between networks.

Among these data, an image, particularly a multivalue image, includes a very large amount of information. Hence, when storing/transmitting an image, the amount of data is very large. Accordingly, when storing/transmitting an image, high-efficiency encoding is adopted in which the amount of data is reduced by removing redundancy of the image, or changing the contents of the image to such a degree that degradation of the picture quality is hardly recognized visually.

A JPEG (Joint Photographic Experts Group) method recommended by ISO (International Organization for Standardization) and ITU-T (International Telecommunication Union—Telecommunication Standardization Sector) is widely used as an internationally standardized high-efficiency encoding method. The JPEG method is based on discrete cosine transform, and has a problem such that block-shaped distortion is generated when increasing the rate of compression.

On the other hand, in apparatuses for inputting or outputting images, a higher rate of compression than in conventional cases is being requested, because higher resolution is required in order to improve the picture quality. In order to deal with such a request, an encoding method utilizing discrete wavelet transform has been proposed as a transform method different from the above-described discrete cosine transform.

The encoding method utilizing discrete wavelet transform has an advantage such that block-shaped distortion causing a problem in the above-described method utilizing discrete cosine transform seldom occurs.

Usually, in the above-described compression encoding method utilizing discrete wavelet transform, processing of transforming an image to be encoded is executed after storing the image in a frame memory for one picture frame, and data for one picture frame after being transformed is stored in the same frame memory or in another frame memory.

The frame memory used in this case can be easily secured in a system based on a computer, but is difficult to secure in a relatively inexpensive peripheral apparatus, such as a digital camera, a scanner, a printer or the like, due to limitations in circuit scale.

In such a case, the present invention is advantageous because an image to be encoded or compressed data of the image is desirably subjected to sequential transform processing (compression encoding) in units smaller than one picture frame, instead of being stored in a frame memory.

In consideration of various types of editing processing to be performed for an image to be encoded or encoded data, it is desirable to divide the image to be encoded or the encoded image into units smaller than one picture frame, particularly, in units of a block, comprising n×m pixels or the like, so as to easily assign a region in two-dimensional directions.

SUMMARY OF THE INVENTION

It is an object of the present invention to solve the above-described problems.

It is another object of the present invention to provide an optimum data arrangement for image data encoded using discrete wavelet transform so as to be efficiently dealt with in each apparatus.

It is still another object of the present invention to provide a method for obtaining, when dealing with image data encoded using discrete wavelet transform, image data having an optimum data arrangement which takes into consideration the capacity of a memory provided in an apparatus dealing with the image data.

It is yet another object of the present invention to provide a method for changing, when dealing with image data encoded using discrete wavelet transform so as to be adapted to an apparatus having a small memory capacity, the arrangement of the image data to an arrangement such that various types of image processing can be easily performed in a desired two-dimensional region.

According to one aspect of the present invention, an image processing apparatus includes input means for inputting first entropy encoded data corresponding to an image. The first entropy encoded data is data produced by entropy encoding a first set of transform coefficients obtained by performing wavelet transform of the image in units of a first type. The apparatus also includes arrangement changing means for entropy decoding the first entropy encoded data to obtain the first set of transform coefficients and for changing the first set of transform coefficients into a second set of transform coefficients corresponding to the result of performing wavelet transform of the image in units of a second type, and entropy encoding means for generating second entropy encoded data by entropy encoding the second set of transform coefficients.

According to another aspect of the present invention, an image processing apparatus includes input means for inputting first entropy encoded data corresponding to an image. The first entropy encoded data is data produced by entropy encoding a first set of transform coefficients obtained by performing wavelet transform of the image in units of a first type. The apparatus also includes arrangement changing means for entropy decoding the first entropy encoded data to obtain the first set of transform coefficients and for changing the first set of transform coefficients into a second set of transform coefficients corresponding to the result of performing wavelet transform of the image in units of a second type, and entropy encoding means for generating second entropy encoded data by entropy encoding the second set of transform coefficients. Furthermore, the apparatus includes an additional arrangement changing means for performing entropy decoding of the second entropy encoded data to obtain the second set of transform coefficients and for changing the second set of transform coefficients into a third set of transfor coefficients corresponding to the result of performing wavelet transform of the image in units of a third type, and additional entropy encoding means for generating third entropy encoded data by entropy encoding the third set of transform coefficients.

According to yet another aspect of the present invention, an image processing method includes an input step of inputting first entropy encoded data corresponding to an image. The first entropy encoded data is data produced by entropy encoding a first set of transform coefficients obtained by performing wavelet transform of the image in units of a first type. The method also includes an arrangement changing step of entropy decoding the first entropy encoded data to obtain the first set of transform coefficients and of changing the first set of transform coefficients into a second set of transform coefficients corresponding to the result of of performing wavelet transform of the image in units of a second type, and an entropy encoding step of generating second entropy encoded data by entropy encoding the second set of transform coefficients.

According to still another aspect of the present invention, in a storage medium storing an image processing program in a state of being readable by a computer, the program includes an input step of inputting first entropy encoded data corresponding to an image. The first entropy encoded data is data produced by entropy encoding a first set of transform coefficients obtained by performing wavelet transform of the image in units of a first type. The program also includes an arrangement changing step of entropy decoding the first entropy encoded data to obtain the first set of transform coefficients and of changing the first set of transform coefficients into a second set of transform coefficients corresponding to the result of performing wavelet transform of the image in units of a second type, and an entropy encoding step of generating second entropy encoded data by entropy encoding the second set of transform coefficients.

According to yet another aspect of the present invention, an image processing apparatus includes input means for inputting first entropy encoded data corresponding to an image. The first entropy encoded data is data produced by entropy encoding a first set of transform coefficients obtained by performing wavelet transform of the image in a first pixel order. The apparatus also includes arrangement changing means for entropy decoding the first entropy encoded data to obtain the first set of transform coefficients and for changing the first set of transform coefficients into a second set of transform coefficients corresponding to the result of performing wavelet transform of the image in a second pixel order, and entropy encoding means for generating second entropy encoded data by entropy encoding the second set of transform coefficients.

According to yet a further aspect of the present invention, an image processing method includes an input step of inputting first entropy encoded data corresponding to an image. The first entropy encoded data is data produced by entropy encoding a first set of transform coefficients obtained by performing wavelet transform of the image in a first pixel order. The method also includes an arrangement changing step of entropy decoding the first entropy encoded data to obtain the first set of transform coefficients and of changing the first set of transform coefficients into a second set of transform coefficients corresponding to the result of performing wavelet transform of the image in a second pixel order, and an entropy encoding step of generating second entropy encoded data by entropy encoding the second set of transform coefficients.

According to still another aspect of the present invention, in a storage medium storing an image processing program in a state of being readable by a computer, the program includes an input step of inputting first entropy encoded data corresponding to an image. The first entropy encoded data is data produced by entropy encoding a first set of transform coefficients obtained by performing wavelet transform of the image in a first pixel order. The program also includes an arrangement changing step of entropy decoding the first entropy encoded data to obtain the first set of transform coefficients and of changing the first set of transform coefficients into a second set of transform coefficients corresponding to the result of performing wavelet transform of the image in a second pixel order, and an entropy encoding step of generating second entropy encoded data by entropy encoding the second set of transform coefficients.

The foregoing and other objects, advantages and features of the present invention will become more apparent from the following description of the preferred embodiments taken in conjunction with the accompanying drawings.

DESCRIPTION OF THE PREFERRED EMBODIMENTS

Preferred embodiments of the present invention will now be sequentially described in detail with reference to the drawings.

First Embodiment

Figure 1:
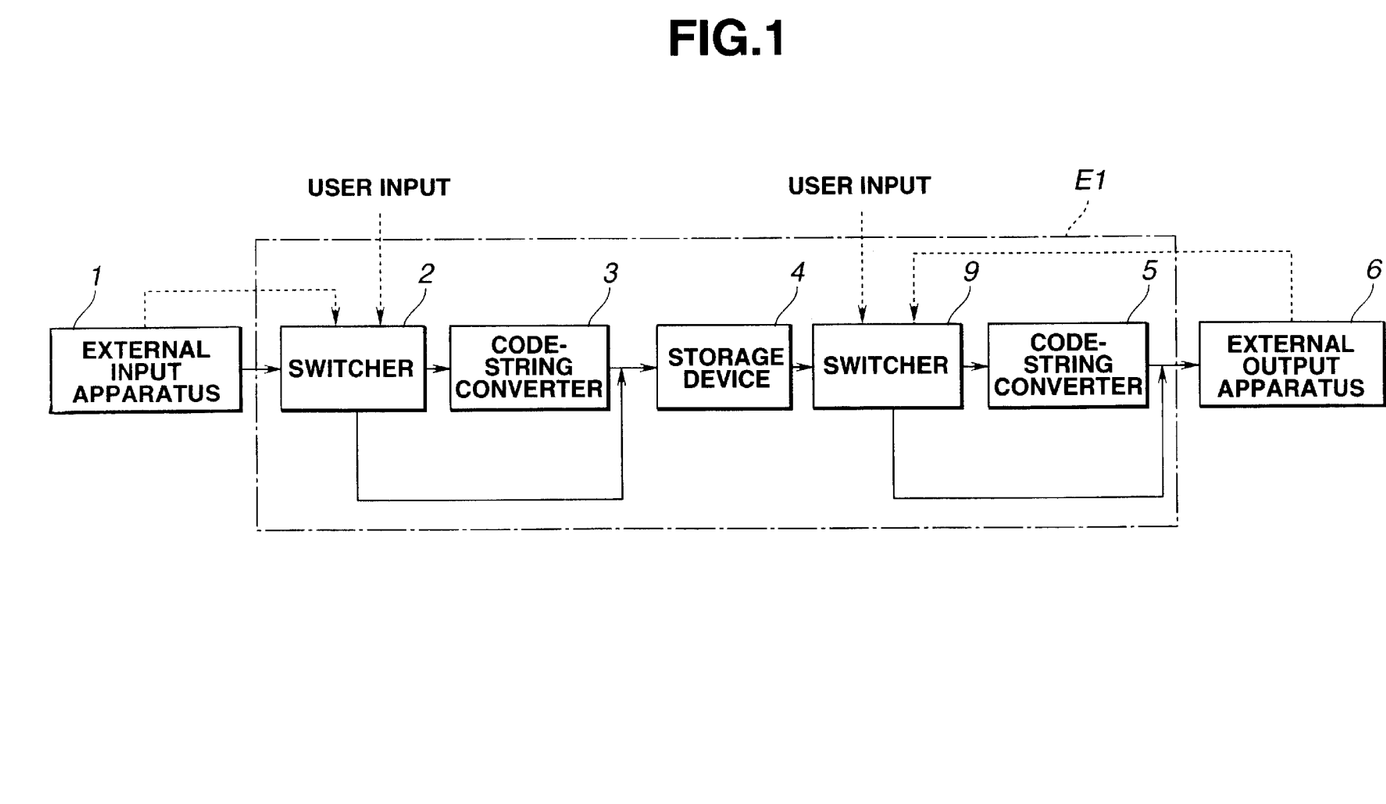
FIG. 1 is a block diagram illustrating a system including an image processing apparatus according to a first embodiment of the present invention.

FIG. 1 is a block diagram illustrating the configurations of an image processing apparatus according to a first embodiment of the present invention, and an image input/output system using the apparatus.

In FIG. 1, portion E1 represents an image processing apparatus which can change arrangement of encoded data. An external input apparatus 1 inputs or generates an image according to a predetermined method, performs compression encoding of the image using discrete wavelet transform, and outputs encoded data. The image processing apparatus E1 stores the encoded data output from the external input apparatus 1, and, for example, displays or edits the stored encoded data. The image processing apparatus E1 also outputs the encoded data to an external output apparatus 6, whenever necessary.

For example, the external input apparatus 1 comprises an image input apparatus, such as a digital camera or a scanner, the image processing apparatus E1 comprises a general-purpose computer, and the external output apparatus 6 comprises a printer.

In such an image processing system, only image data corresponding to a necessary partial region of an image input from the external input apparatus 1, such as a digital camera or the like, is edited, processed or reviewed in a general-purpose computer. Then, the image data can be output to the external output apparatus 6.

The function of each block will now be described. In the following description, encoded data to be dealt with is obtained by encoding gray-scale black-and-white image data. However, the present invention is not limited to such data, but may also be applied to a case in which encoded data of a color image is dealt with. In such case, by repeatedly performing a processing procedure of the first embodiment to each color signal, the same effects as in the first embodiment may also be obtained.

Figure 3A:
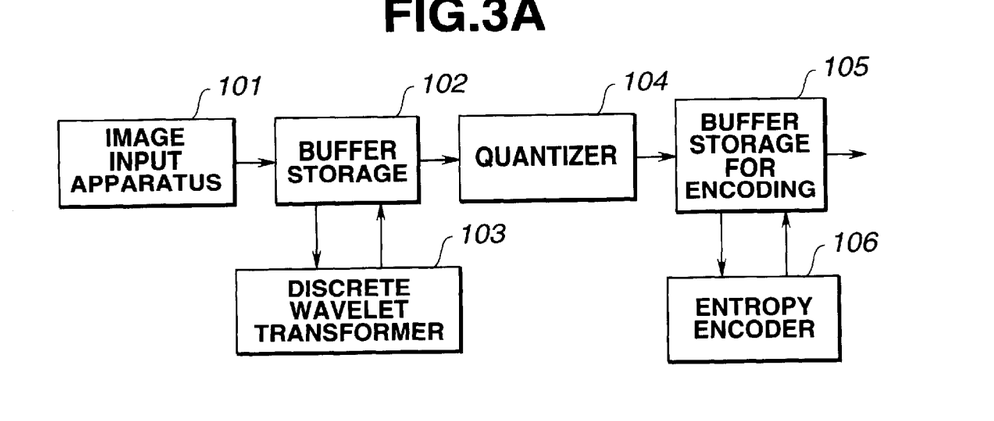
FIGS. 3A–3C are diagrams illustrating the configuration and the operation of an external input apparatus.
Figure 3B:
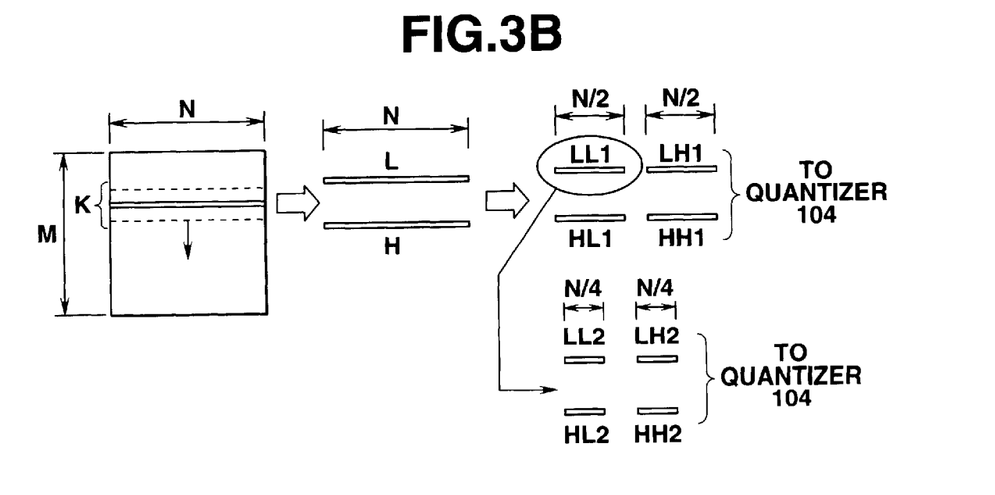
Figure 3C:
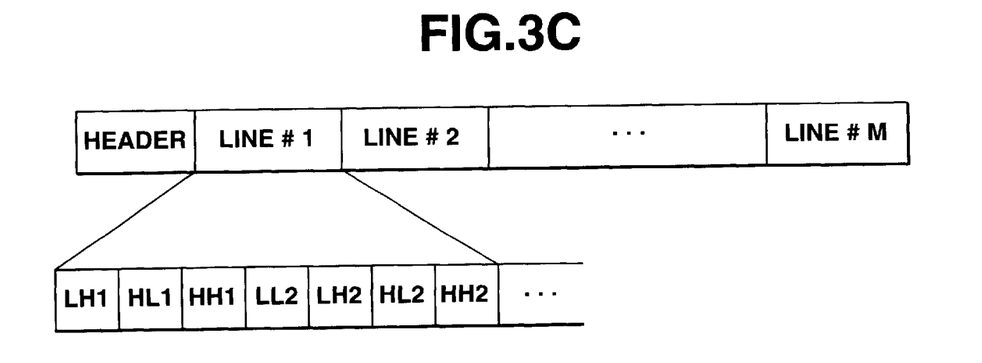

FIGS. 3A–3C are diagrams illustrating the configuration and the function of the external input apparatus 1. FIG. 3A is a block diagram illustrating the configuration of the external input apparatus 1. In FIG. 3A, multivalue image data generated by an image input apparatus 101 is output to a buffer storage 102. The image input apparatus 101 comprises a sensor, such as a CCD (charge-coupled device) or the like. Analog multivalue image data is generated by reading an original or a landscape by the CCD. The generated analog multivalue image data is converted into digital image data by an A/D (analog-to-digital) converter within the image input apparatus 101. The generated digital image data is temporarily stored in the buffer storage 102.

The buffer storage 102 includes a first memory region capable of storing multivalue image data for at least K lines input from the image input apparatus 1, and a second memory region capable of storing transform coefficients for two lines input from a discrete wavelet transformer 103.

The discrete wavelet transformer 103 performs known discrete wavelet transform for the multivalue image data stored in the buffer storage 102, and generates/outputs transform coefficients whose number equals the number of pixels represented by the multivalue image data. The generated transform coefficients can be classified into subblocks representing different types of frequency components. When performing discrete wavelet transform in units of a line, the size of each of the subblocks is usually $\frac{1}{2^n}$ (n is an integer equal to or larger than 1) of the size of the original image represented by the multivalue image data.

The discrete wavelet transform is executed by performing low-pass filtering processing and high-pass filtering processing for the input multivalue image data, and performing down sampling of output of each filter to $\frac{1}{2}$. Since the discrete wavelet transform is a known technique, further description thereof will be omitted.

FIG. 3B is a diagram illustrating the operation of the discrete wavelet transformer 103. The discrete wavelet transformer 103 does not perform discrete wavelet transform while holding multivalue image data for the entire input image. However, the discrete wavelet transformer 103 can obtain substantially the same contents as transform coefficients obtained by performing discrete wavelet transform while holding multivalue image for the entire image by performing filtering processing for a few lines corresponding to a part of the multivalue image.

A case in which the input multivalue image data represents M pixels in the vertical direction and N pixels in the horizontal direction will be considered.

It is assumed that the external input apparatus 1 shown in FIG. 1 does not include an expensive large-capacity buffer memory. Namely, the buffer storage 102 or the like does not have a capacity for storing image data for one frame. Accordingly, as indicated by broken lines in FIG. 3B, data for K lines, which correspond to a minimum required number even when discrete wavelet transform is performed in units of a line, of the original multivalue image data input from the image input apparatus 101 is appropriately stored in the buffer storage 102. Every time discrete wavelet transform for one line is completed, currently stored data for the oldest line of the multivalue image data is deleted in the first memory region, and data for one new line of the multivalue image data is input from the image input apparatus 1 and is stored in the buffer storage 102. The input/output of the multivalue image data is performed in the sequence of raster scanning.

The value K is automatically determined based on the number of taps of filters used in discrete wavelet transform, and corresponds to the number of lines necessary for decomposition of one level (corresponding to processing of decomposing the original image into a subblock LL obtained by passing the image through a low-pass filter in two-dimentional directions, two subblocks LH and HL obtained by passing the image through a low-pass filter in one dimension and through a high-pass filter in another dimension, and a subblock HH obtained by passing the image through a high-pass filter in two-dimensional directions).

The discrete wavelet transformer 103 performs encoding processing for data of a center line from among the multivalue image data for K lines within the buffer storage 102. By referring to multivalue image data for other lines for the data of the center line, filtering in the vertical direction is performed using a low-pass filter and a high-pass filter, and a low-pass-filter output L and a high-pass-filter output H corresponding to the amount of data for two lines are output. The filter outputs L and H for two lines are temporarily stored in the second memory region of the buffer storage 102.

Then, low-pass filtering and high-pass filtering are also performed in the horizontal direction for the two filter outputs L and H in the vertical direction. As a result, as shown in FIG. 3B, four outputs having a length of N/2, i.e., LL1, LH1, HL1 and HH1 are calculated. These outputs are overwritten on the filter outputs L and H in the second memory region.

These outputs are obtained by decomposing the input multivalue image data into the above-described plurality of types of frequency bands. Usually, these frequency bands are called subbands.

Three subbands belonging to high-frequency components (bands), i.e., LH1, HL1 and HH1, are no longer subjected to discrete wavelet transform, and therefore are immediately output from the buffer storage 102 to a quantizer 104 provided at the succeeding stage. The data LL1 belonging to a lowest-frequency component is further subjected to frequency decomposition of the next level according to the similar processing (processing of decomposing the data into four subbands). Thus, four outputs having a length of N/4, i.e., LL2, LH2, HL2 and HH2, are calculated in addition to the three subbands previously transmitted to the quantizer 104, and are output to the quantizer 104 after being temporarily stored in the buffer storage 102. Thus, discrete wavelet transform for multivalue image data for one line is completed. This processing is repeated for all lines.

According to the above-described processing, the data LL1 or LL2 corresponding to the lowest-frequency component at each level is data corresponding to a reduced image of the original multivalue image.

In the configuration shown in FIGS. 3A and 3B, since the capacity of the buffer storage 102 is small, in the above-described frequency decomposition processing in units of a line, the high-frequency components LH1, HL1 and HH1 for which decomposition processing has been terminated are first output to the quantizer 104. Then, after opening the second memory region as much as possible, the low-frequency components LL2, LH2, HL2 and HH2 are generated in the memory. In such an output sequence, it is impossible to output hierarchical encoded data for which the decoding side can recognize the outline of an image to be encoded at an early stage, i.e., to output a certain image region from low-frequency components to high-frequency components.

In the first embodiment, by performing two-level discrete wavelet transform of input multivalue image data for each line, the storage capacity of the buffer storage 102 which is usually required for this transform processing is reduced. However, the present invention is not limited to such an approach, but may perform transform with arbitrary levels in accordance with the entire compression encoding method or the contents of the image.

Then, the quantizer 104 quantizes image data (transform coefficients) corresponding to the input subbands LH1, HL1, HH1, LL2, LH2, HL2 and HH2 with a predetermined method, and sequentially outputs quantized values. A known technique, such as scalar quantization, vector quantization or the like, may be utilized for this quantization.

One type of quantization step may be used. However, efficient encoding in which human visual sense is taken into consideration can be realized by using a quantization step having a large width for subbands of high-frequency components and using a quantization step having a relatively small width for subbands of low-frequency components, in consideration of values of frequency components represented by respective subbands.

Quantized values for respective subbands output from the quantizer 104 are temporarily stored in a buffer storage for encoding 105 in units of a subband belonging to the same frequency band. Then, an entropy encoder 106 refers to the quantized values within the buffer storage for encoding 105, and outputs encoded data obtained by performing entropy encoding of the quantized values so as to store the data in the same region or a different region of the buffer storage for encoding 105. Arithmetic encoding, Huffman encoding or the like may be used as the entropy encoding.

FIG. 3C illustrates the structure of the encoded data generated in the above-described manner. In FIG. 3C, a header includes additional information, such as the size of the image input to the image input apparatus 101, the number of color components, a flag indicating that encoding is performed in units of a line, and the like. After the header, encoded data obtained by encoding respective lines of the multivalue image data according to the above-described method are sequentially arranged from the first line.

In the first embodiment, quantized values corresponding to each line are subjected to entropy encoding independently for each line. Namely, the encoding operation of the entropy encoder 106 is reset in units of a line.

However, the present invention is not limited to such an approach. Quantized values corresponding to each line may be subjected to entropy encoding not completely independently. Namely, when executing arithmetic encoding, the encoding operation of the entropy encoder 106 may not be reset in units of a line, but may continue for a few lines in the order of raster scanning. It is thereby possible to perform compression encoding with a higher compression ratio by utilizing overall correlation of the original multivalue image. The encoded data shown in FIG. 3C is output to a switcher 2 shown in FIG. 1.

In the foregoing description, in the image input apparatus 1, discrete wavelet transform and entropy encoding are performed in units of a line (in the order of raster scanning) of the original image.

However, as for encoded data obtained in the above-described encoding method, there is a problem such that it is necessary to refer to encoded data for a horizontal width (including n pixels) of one picture frame even when editing only a partial region having arbitrary vertical and horizontal widths of a coordinate. In addition, it is impossible to obtain the basic effect of discrete wavelet transform of allowing hierarchical reproduction by performing transmission/reception in the order from encoded data corresponding to low-frequency components to encoded data corresponding to high-frequency components. In order to obtain such an effect, it is necessary to perform wavelet transform or entropy encoding in units of a block smaller than one picture frame comprising M×N pixels in two-dimensional directions.

Figure 4A:
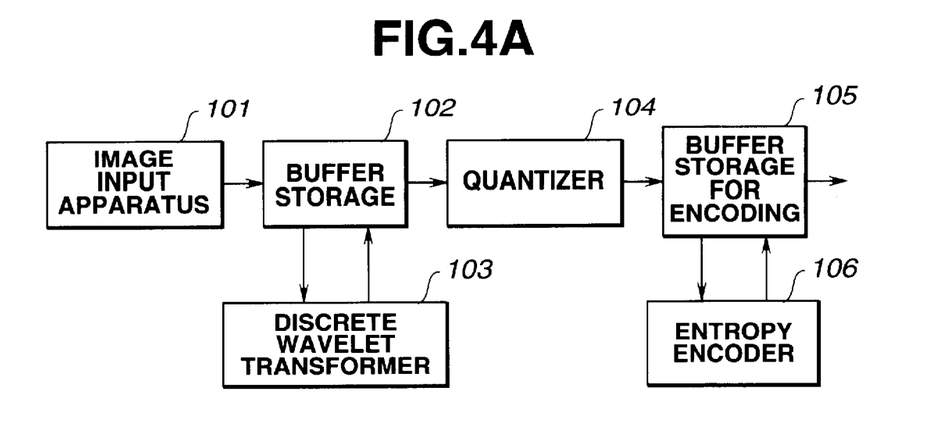
FIGS. 4A–4C are diagrams illustrating the configuration and the operation of another external input apparatus.
Figure 4B:
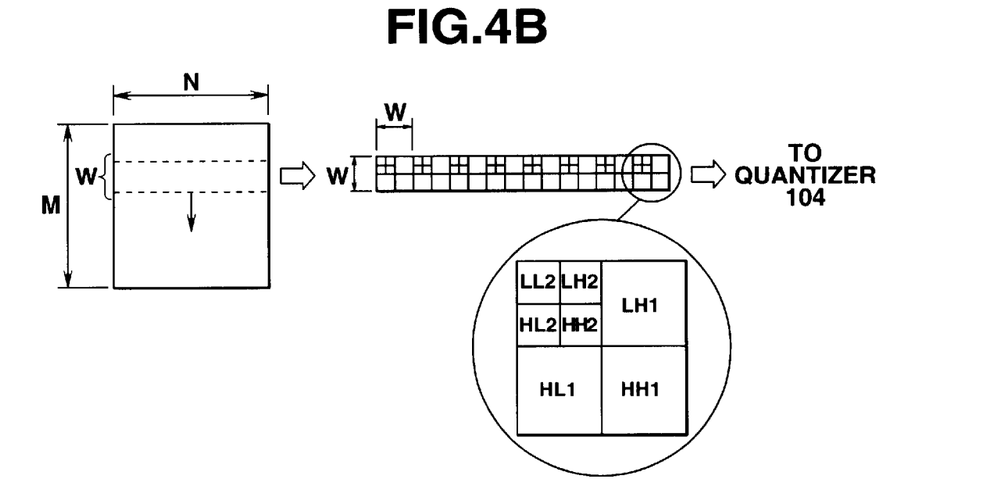
Figure 4C:
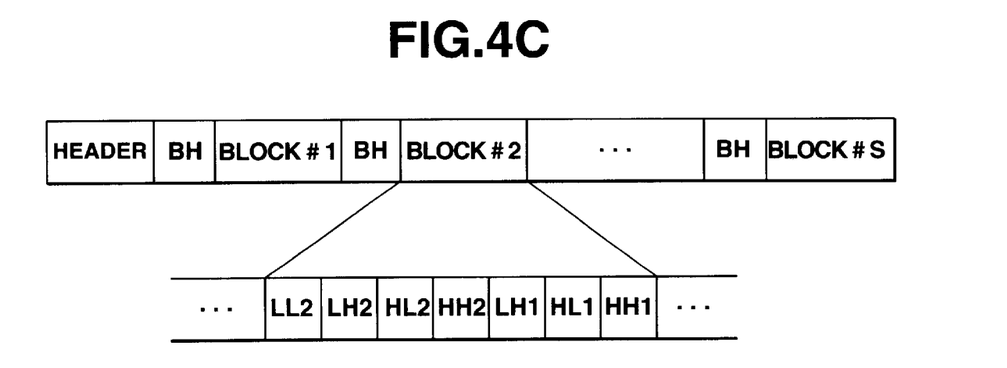

FIGS. 4A–4C are diagrams illustrating the configuration of a block for performing encoding using discrete wavelet transform with a unit different from the configuration of the external input apparatus 1 shown in FIG. 3A, i.e., in units of a block smaller than the vertical and horizontal widths for one picture frame in two-dimensional directions, and the encoding operation. In the following description, it is assumed that a square block comprising W×W pixels is used as the unit of the block. However, the present invention is not limited to such a case. A nonsquare block may also be used.

An external input apparatus 1 in this case may be considered to be, for example, a high-grade digital camera having a large-capacity memory. A buffer storage 102 shown in FIG. 4A can store multivalue image data comprising at least W×N pixels, and therefore has a capacity larger than the buffer storage 102 shown in FIG. 3A. Accordingly, the buffer storage 102 can assuredly perform discrete wavelet transform in units of W×W pixels, where K<W, and, as a result, can easily perform image editing in units of a block comprising W×W pixels. It is assumed that W is a number sufficiently smaller than M and N.

In FIG. 4A, the basic circuit configuration is identical to the circuit configuration of the external input apparatus 1 performing encoding in units of a line shown in FIG. 3A. However, the unit of discrete wavelet transform by a discrete wavelet transformer 103 differs from the above-described case, i.e., discrete wavelet transform is performed in units of a block of a predetermined size of W×W pixels instead of in units of a line (the order of raster scanning). As shown in FIG. 4B, transform coefficients after discrete wavelet transform in units of W×W pixels generate LL2, LH2, HL2, HH2, LH1, HL1 and HH1, which are written in the buffer storage 102. The obtained transform coefficients in units of W×W pixels are also used in quantization processing and entropy encoding processing at the succeeding stages.

FIG. 4C illustrates the configuration of encoded data obtained by encoding processing of the circuitry shown in FIG. 4A. As in the above-described case of encoding processing in units of a line, a header includes additional information, such as the size of the image input to the image input apparatus 101, the number of color components, a flag indicating that encoding is performed in units of a line, and the like. After the header, encoded data obtained by independently encoding respective blocks having the size of W×W pixels are sequentially provided. Symbol BH represents the header of each block, and includes information necessary for the unit of each block, such as the code length in each block, and the like. Thus, each block can be independently decoded in decoding processing.

By encoding data in the above-described unit, it is possible to easily edit only a partial region smaller than the vertical and horizontal widths of one picture frame in two-dimensional directions. For example, it is possible to extract only encoded data of some blocks corresponding to a block whose region is assigned with desired vertical and horizontal widths from among the encoded data, and to decode/edit/again encode only the extracted encoded data.

Since data can be output after quantization in the succeeding stage in the order of LL2, LH2, HL2, HH2, LH1, HL1 and HH1 for each block having the size of W×W pixels, it is possible to perform image decoding/reproduction such that the reproduced image gradually changes from low picture quality (an image generated only from low-frequency components) to high picture quality (an image generated using all frequency components) for each block.

Since the buffer storage 102 shown in FIG. 4A has a capacity of at least W×N pixels, such hierarchical output may be performed for each band comprising W×N pixels. In such a case, data LL2 of Blocks #1–#S are first output. Then, data LH2, HL2 and HH2 of each block are output, followed by output of data LH1, HL1 and HH1 of each block.

The switcher 2 shown in FIG. 1 receives encoded data from the external input apparatus 1, and outputs the encoded data to a code-string converter 3 or a storage device 4 at the succeeding stage. The switching operation of the switcher 2 is performed in accordance with control input of a control signal from the external input apparatus 1 and a manual instruction from the user.

The control signal from the external input apparatus 1 may be included in the above-described encoded data, or may be received through a separately provided control line. In either case, the control input indicates whether encoding has been performed in the external input apparatus 1 in units of a line or in units of a block. It can be considered that this control input indicates the capacity of the buffer storage required for encoding in the external input apparatus 1.

When encoding has been performed in units of a line, in order to obtain encoded data (discrete wavelet transform coefficients) in units of a block preferred in a superior-function image processing apparatus, the switcher 2 outputs the input encoded data to the code-string converter 3. When encoding has been performed in units of a block, the input encoded data is output to the storage device 4 without being modified. The code-string converter 3 will now be described.

Figure 5A:
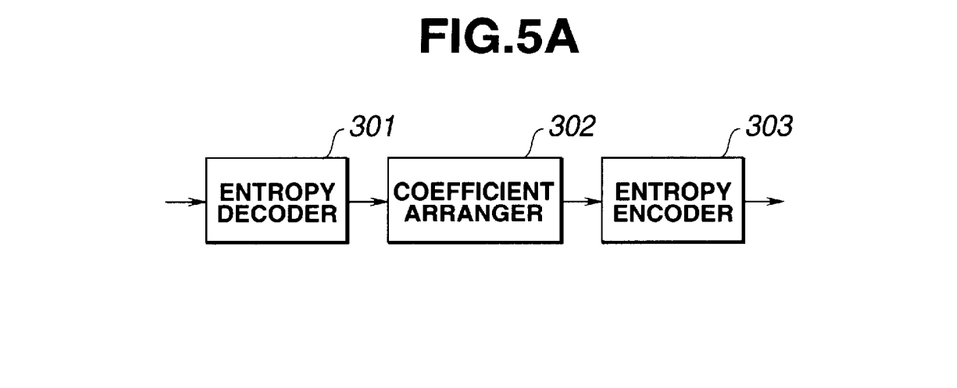
FIGS. 5A–5D are diagrams illustrating the configuration and the operation of a code-string converter.

FIGS. 5A–5D illustrate the configuration and the operation of the code-string converter 3. FIG. 5A illustrates the internal configuration of the code-string converter 3. Original quantized values are obtained by decoding the encoded data input from the switcher 2 by an entropy decoder 301. Then, a coefficient arranger 302 rearranges the quantized values in a data arrangement which will be obtained when performing discrete wavelet transform for each two-dimensional block (comprising W×W pixels in this description). Then, an entropy encoder 303 again performs entropy encoding of the quantized values in this new data arrangement, and outputs resultant data to the succeeding stage.

Figure 5B:
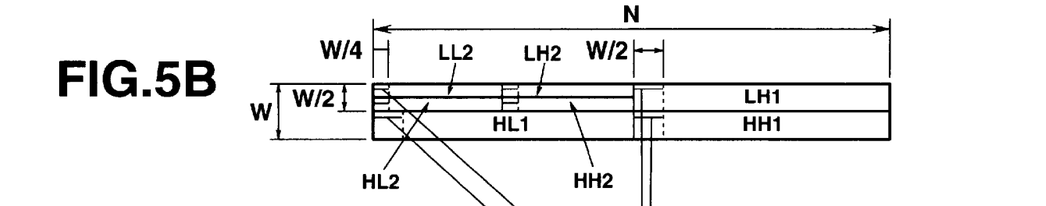
Figure 5C:
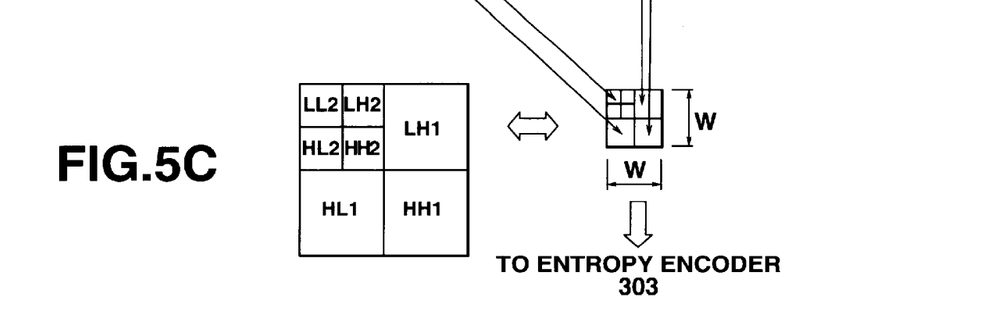

FIGS. 5B and 5C illustrate the operation of the coefficient arranger 302. The quantized values output from the entropy decoder 301 are temporarily stored in a buffer storage within the coefficient arranger 302.

As shown in FIG. 5B, this buffer storage has a length equal to or larger than the number of pixels N of the input multivalue image data in the horozintal direction, and has a size equal to or larger than W lines in the vertical direction. The input quantized values are sequentially written in this buffer storage. At that time, quantized values belonging to the same subband are written in an arrangement so as to be spatially adjacent to each other. For example, a series of quantized values corresponding to LL2 when performing discrete wavelet transform of input multivalue image data are written in units of an input line at an upper left portion in FIG. 5B. After storing input multivalue image data for a predetermined number of lines (W in this case) in the buffer storage within the coefficient arranger 302 in the above-described manner, the stored data is changed to quantized values in the same data arrangement as when performing discrete wavelet transform in units of a block comprising W×W pixels.

Namely, the coefficient arranger 302 reads quantized values stored in the internal buffer storage as shown in FIG. 5B in an order different from the order when inputting the quantized values (i.e., a data arrangement obtained when performing discrete wavelet transform in units of a block comprising W×W pixels), and outputs the read quantized values to an entropy encoder 303 at the succeeding stage.

FIG. 5C illustrates the data reading method at that time. Quantized values corresponding to a region comprising W×W pixels are read from the buffer storage. At that time, quantized values corresponding to the first level of discrete wavelet transform are read for each length of W/2, and quantized values corresponding to the second level of discrete wavelet transform are read for each length of W/4, as shown in FIG. 5B. The read values are grouped in units of each subband, and are output to the entropy encoder 303 at the succeeding stage.

Figure 5D:
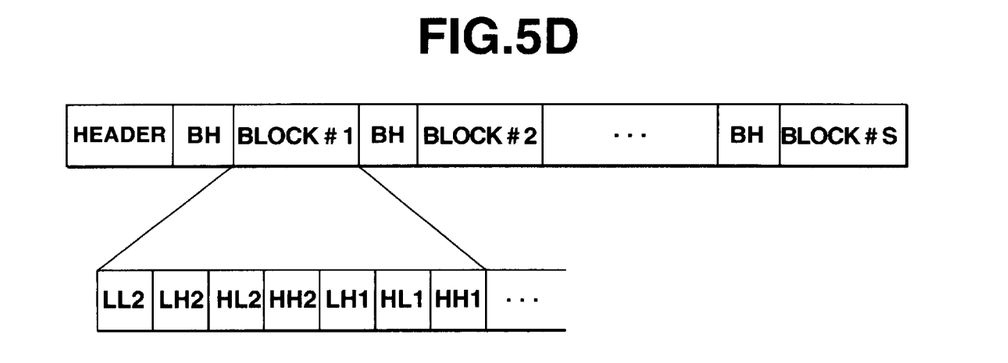

The entropy encoder 303 performs entropy encoding indenpendently in units of the input block comprising W×W pixels, and outputs encoded data. FIG. 5D illustrates the configuration of the encoded data, in which, after a header including the size of the input multivalue image data, the number of color components, a flag indicating that encoding has been performed in units of a block, and the like, encoded data in which each block is independently encoded is provided. In this case, a flag indicating the unit of encoding stored in header information as shown in FIG. 3C is rewritten.

Symbol BH represents the header of each block, and includes information necessary for the unit of each block, such as the code length in each block, and the like. Thus, each block can be independently decoded in decoding processing. The encoded data is output to and stored in the storage device 4.

As described above, whether encoded data input to the image processing apparatus E1 is encoded data obtained by performing discrete wavelet transform in units of a line or encoded data obtained by ordinary encoding in units of a block, encoded data stored in the storage device 4 of the image processing apparatus including a buffer memory having a large capacity can be provided as data that is very easy to use which is obtained when encoding multivalue image data input to the input apparatus according to discrete wavelet transform independently in units of a block. Accordingly, it is very efficient when it is intended to perform image editing individually for each partial region smaller than one picture frame in two-dimensional directions.

Next, a description will be provided of a procedure when outputting encoded data stored in the storage device 4 to an external output apparatus 6.

In FIG. 1, encoded data stored in the storage device 4 is output to a second switcher 9 at the succeeding stage. The basic function of the second switcher 9 is the same as the above-described first switcher. The second switcher 9 performs switching of whether input encoded data is to be temporarily output to the code-string converter 5 or directly to the external output apparatus 6.

A control input from the external output apparatus 6 where data is to be output or a manual control input from the user is used as the control input to the switcher 9 in this case. Information indicating the capacity of the buffer storage usable by the external output apparatus 6 during decoding using inverse wavelet transform is adopted as the control input from the external output apparatus 6. When the capacity of the buffer storage necessary for inverse wavelet transform by the external output apparatus 6 is insufficient based on this information, the code-string converter 5 provides arrangement of encoded data obtained by performing wavelet transform of the encoded data in units of a line. According to this switching processing, it is possible to output encoded data according to wavelet transform having an optimum data format (arrangement) in accordance with whether endoded data decodable by the external output apparatus 6 has been obtained after wavelet transform in units of a line or in units of a block.

Figure 6A:
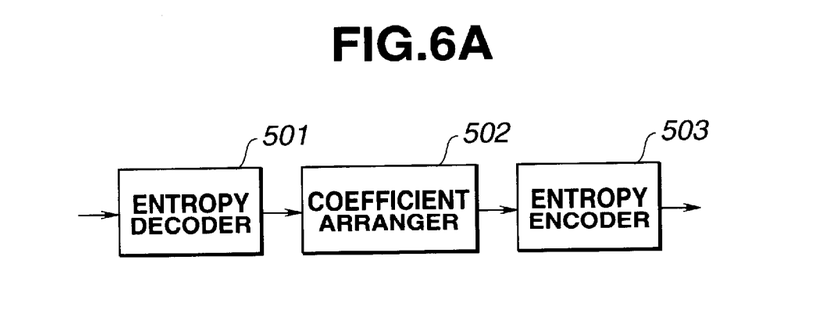
FIGS. 6A–6C are diagrams illustrating the configuration and the operation of another code-string converter.

Next, the operation of the code-string converter 5 will be described with reference to FIGS. 6A–6C. The code-string converter 5 converts encoded data obtained by wavelet transform in units of a block into a data arrangement of encoded data obtained by wavelet transform in units of a line. As shown in FIG. 6A, the code-string converter 5 includes an entropy decoder 501, a coefficient arranger 502, and an entropy encoder 503.

The input encoded data is decoded by the entropy decoder 501. Since the encoded data at that time is encoded in units of a block as shown in FIG. 5D, decoded quantized values are configured in units of a block. The coefficient arranger 502 at the succeeding stage arranges the quantized values in units of a block thus obtained so that quantized values belonging to the same subband are arranged in units of a line over a series of blocks, and outputs the arranged quantized values to the entropy encoder 503 at the succeeding stage when the quantized values for one line of the input image are provided.

Figure 6B:
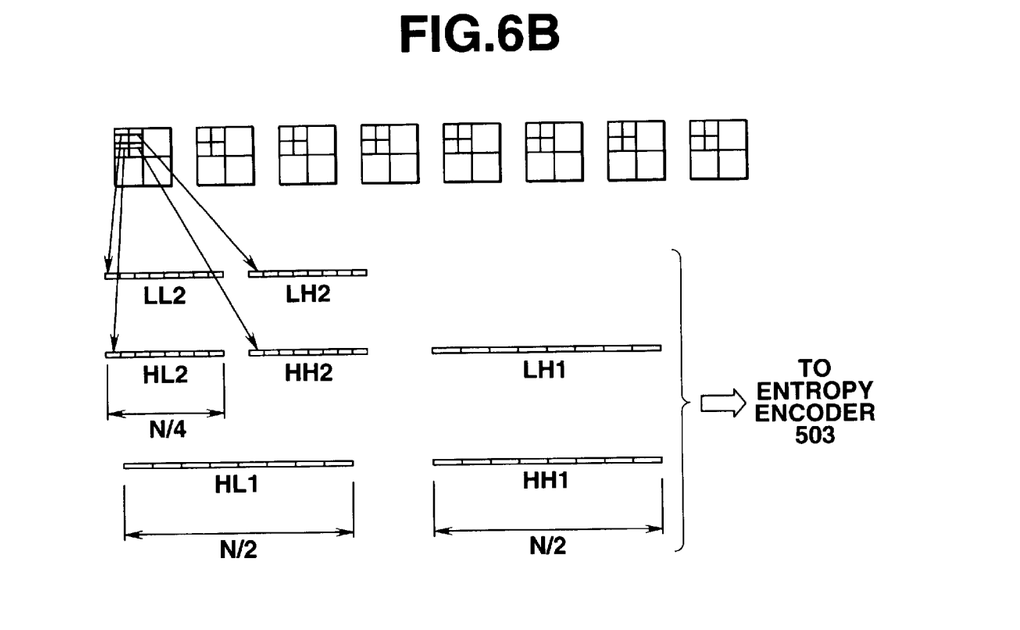
Figure 6C:
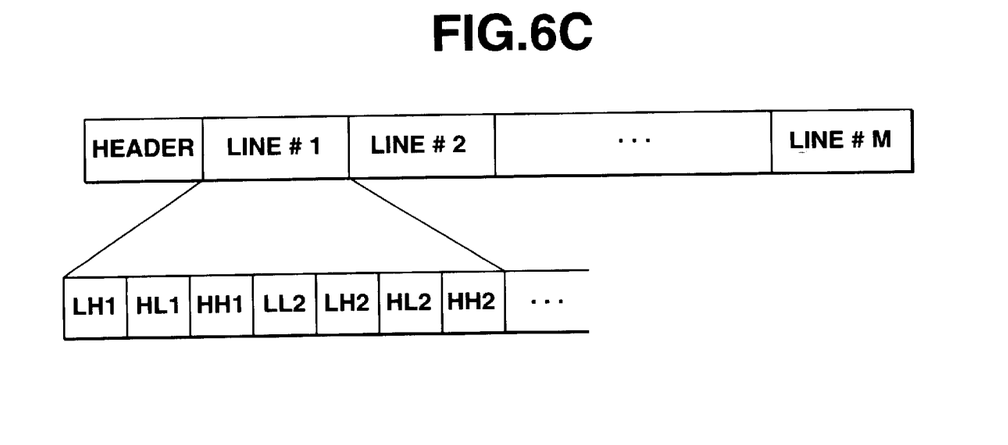

FIG. 6B illustrates the manner of this operation. In this description, it is assumed that the image includes eight blocks in the horizontal blocks. Quantized values belonging to respective subbands are read for a length corresponding to one line of the image from the eight blocks, to provide quantized values in units of a line.

The entropy encoder 503 performs entropy encoding of the input quantized values in units of a line, and outputs resultant data. FIG. 6C illustrates an example of encoded data at that time. In FIG. 6C, a header includes information, such as the size of the input multivalue image data, the number of color components, a flag indicating that encoding is performed in units of a line, and the like. In this case, a flag indicating the unit of encoding stored in the header information as shown in FIG. 4C is rewritten.

After the header, encoded data obtained by encoding respective lines of the image according to the above-described method are sequentially arranged from the first line.

In the first embodiment, quantized values corresponding to each line are subjected to entropy encoding independently for each line. Namely, the encoding operation of the entropy encoder 503 is reset in units of a line.

However, the present invention is not limited to such an approach. Quantized values corresponding to each line may be subjected to entropy encoding not completely independently. Namely, when executing arithmetic encoding, the encoding operation of the entropy encoder 503 may not be reset in units of a line, and may continue for a few lines in the order of raster scanning. It is thereby possible to perform compression encoding with a higher compression ratio by utilizing overall correlation of the original multivalue image.

This configuration is the same as the encoded data shown in FIG. 3C, which is obtained by performing discrete wavelet transform in units of a line. Accordingly, the capacity of the memory for operation required during decoding can be minimized.

Figure 7:
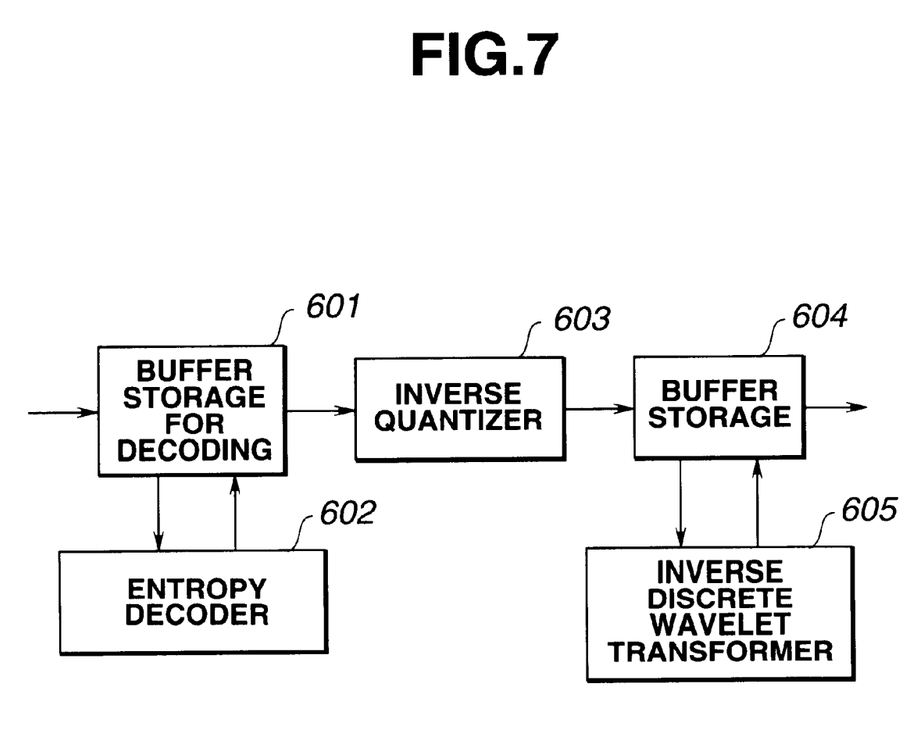
FIG. 7 is a block diagram illustrating the configuration of an external output apparatus.

The configuration of the external output apparatus is shown in FIG. 7. The input encoded data is read into a buffer for decoding 601 and is decoded by an entropy decoder 602, and obtained quantized values are output to an inverse quantizer 603 at the succeeding stage. The inverse quantizer 603 performs inverse quantization of the input quantized values, and outputs a coefficient string provided by discrete wavelet transform. This coefficient string is written into a buffer storage 604, and is subjected to inverse transform by an inverse discrete wavelet transformer 605 to restore an original image, which is output. This inverse transform is inverse to the procedure of forward-direction transform shown in FIG. 3B.

As described above, it is possible to output encoded data in an optimum format (arrangement) encoded using discrete wavelet transform to both an apparatus which has a sufficient capacity of a buffer storage necessary for inverse discrete wavelet transform by the external output apparatus 6, and an apparatus which has an insufficient capacity of the buffer storage.

Second Embodiment

Although in the above-described first embodiment, the image processing apparatus according to the present invention receives encoded data obtained by compressing an image as an external input, a second embodiment of the present invention has a different configuration.

Figure 2:
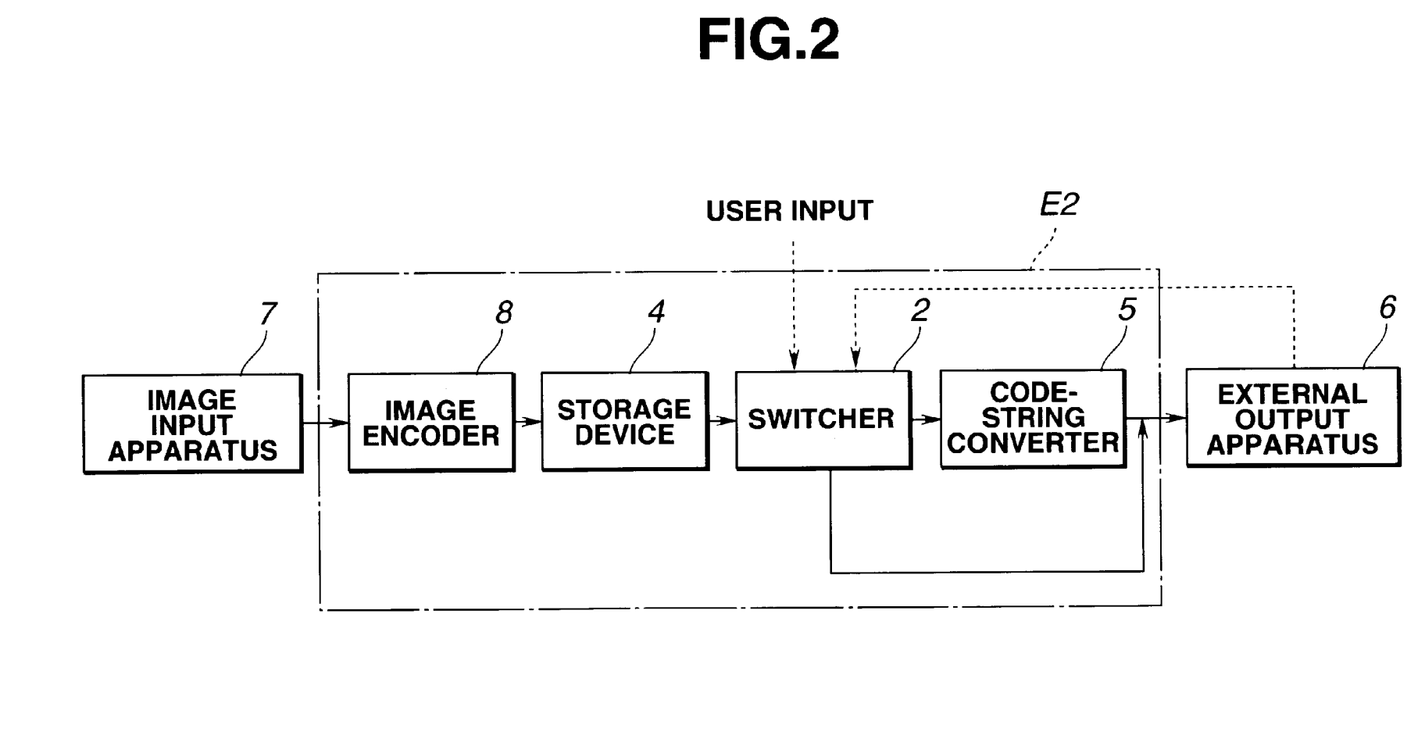
FIG. 2 is a block diagram illustrating a system including an image processing apparatus according to a second embodiment of the present invention.

FIG. 2 is a block diagram illustrating the configurations of an image processing apparatus according to the second embodiment, and an image input/output system using the apparatus.

In FIG. 2, portion E2 represents a block diagram of the image processing apparatus for changing data arrangement in accordance with an external output apparatus 6. An image input apparatus 7 receives or generates multivalue image data with a predetermined method, digitizes the image data, and outputs multivalue digital image data.

The image processing apparatus E2 encodes, in image encoder 8, the multivalue image data output from the image input apparatus 7, temporarily stores resultant data in a storage device 4, and outputs the stored data to an external output apparatus 6 as encoded data whenever necessary.

For example, a system including the image input apparatus 7 and the image processing apparatus E2 corresponds to an image input apparatus, such as a digital camera, a scanner or the like. The system temporarily stores an input image, and outputs the stored data to an external computer or printer, or the like, whenever necessary.

The function of each block will now be described. Although in the following description, image data is assumed to be data representing gray-scale black-and-white image, the present invention is not limited to such data. For example, the present invention may be applied to a case of processing data of a color image having a plurality of color components. In this case, the same effects as in the following description may be obtained by performing processing for black-and-white image data to be described below to each color data.

Figure 8:
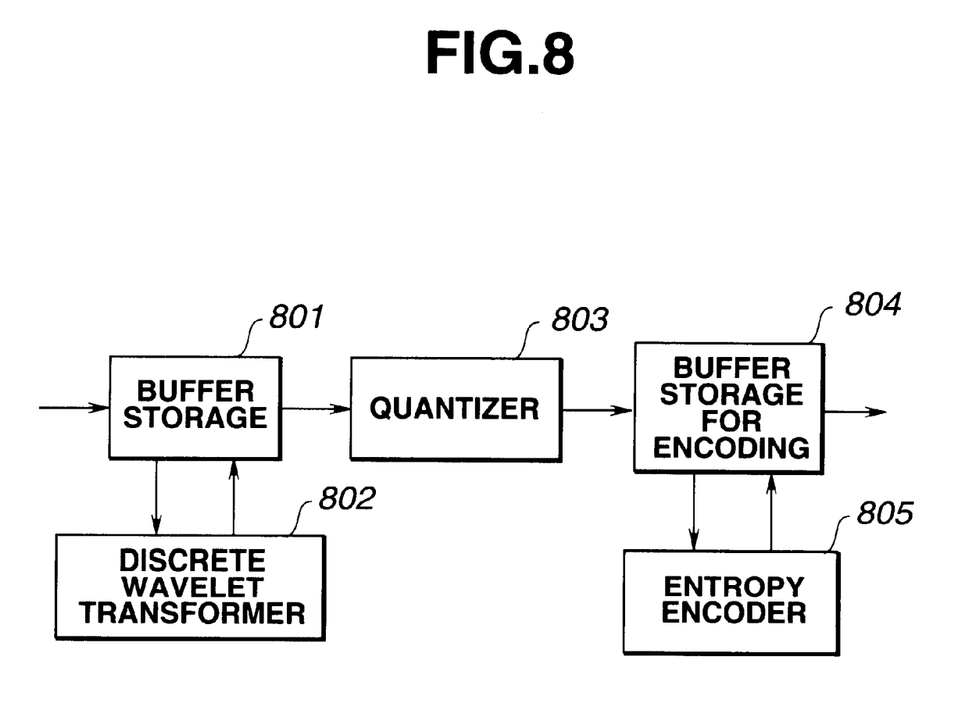
FIG. 8 is a block diagram illustrating the configuration of an image encoder shown in FIG. 2.

The multivalue image data output from the image input apparatus 7 is input to an image encoder 8, and is subjected to compressing encoding. FIG. 8 is a block diagram illustrating the configuration of the image encoder 8. In FIG. 8, the input multivalue image data is temporarily stored in a buffer storage 801, and is then subjected to discrete wavelet transform by a discrete wavelet transformer 802. The transform at that time is performed either in units of a line as described with reference to FIGS. 3A–3C, or in units of a block as described with reference to FIGS. 4A–4C, in the first embodiment.

A series of transform coefficients obtained by the transform operation of the discrete wavelet transformer 802 are quantized by a quantizer 803 at the succeeding stage. Obtained quantized values are output to a buffer storage for encoding 804.

An entropy encoder 805 performs entropy encoding for the quantized values stored in the buffer storage for encoding 804, and outputs encoded data to a storage device 4 at the succeeding stage. The output encoded data is either indenpedent in units of a line as shown in FIG. 3C, or independent in units of a block as shown in FIG. 4C.

The procedure when outputting the encoded data stored in the storage device 4 is the same as in the first embodiment. Namely, the encoded data output from the storage device 4 is switched by a switcher 2 in accordance with input of information indicating data arrangement from an external output apparatus 6 or the user, so as to determine whether the data is to be first output to a code-string converter 5 or directly to the external output apparatus 6.

The code-string converter 5 converts the encoded data from the storage device 4 into encoded data having a data arrangement decodable with the capacity of a buffer storage provided in the external output apparatus 6.

Namely, when the encoded data from the storage device 4 is obtainded by performing wavelet transform in units of a block as described with reference to FIGS. 4A–4C, and the capacity of the buffer storage usable during decoding by the external output apparatus 6 where the encoded data is to be output is small and encoded data obtained by performing wavelet transform in units of a line as described with reference to FIGS. 3A–3C can be decoded, data arrangement of the encoded data is converted using the code-string converter 5 according to the method described with reference to FIGS. 6A–6C.

On the other hand, when the encoded data from the storage device 4 is obtainded by performing wavelet transform in units of a line as described with reference to FIGS. 3A–3C, and the capacity of the buffer storage usable during decoding by the external output apparatus 6 where the encoded data is to be output is relatively large and encoded data obtained by performing wavelet transform in units of a block as described with reference to FIGS. 4A–4C can also be decoded, data arrangement of the encoded data is converted using the code-string converter 5 according to the method described with reference to FIGS. 5A–5D.

When the encoded data from the storage device 4 is obtained by performing wavelet transform in units of a line as described with reference to FIGS. 3A–3C, and the capacity of the buffer storage usable during decoding by the external output apparatus 6 where the encoded data is to be output is small, and only encoded data obtained by performing wavelet transform in units of a line as described with reference to FIGS. 3A–3C can be decoded, or when the encoded data from the storage device 4 is obtainded by performing wavelet transform in units of a block as described with reference to FIGS. 4A–4C, and the capacity of the buffer storage usable during decoding by the external output apparatus 6 where the encoded data is to be output is relatively large and encoded data obtained by performing wavelet transform in units of a block as shown in FIGS. 4A–4C can also be decoded, the encoded data is directly output from the switcher 2 to the external output apparatus 6.

Other Embodiments

In the above-described embodiments, the external input apparatus and the external output apparatus correspond to an image input apparatus, such as a digital camera or the like, and an image output apparatus, such as a printer or the like, respectively. However, apparatuses having the same configurations as the image processing apparatuses E1 and E2 may be used as the external input apparatus and the external output apparatus, respectively.

The image processing apparatus E1 or E2 may be directly connected to the external input apparatus and the external output apparatus via a cable or the like, or via a network.

The present invention is not limited to the apparatus and the method for realizing each of the above-described embodiments, but may also be applied to a case in which the above-described embodiments are realized by supplying a computer (a CPU (central processing unit) or an MPU (microprocessor unit)) within the system or the apparatus with program codes of software for realizing the above-described embodiments, and operating the above-described devices by the computer of the apparatus or the system in accordance with the program codes.

In such a case, the program codes themselves of the software realize the functions of the above-described embodiments, so that the program codes themselves, means for supplying the computer with the program codes, more spefically, a storage medium storing the program codes, constitute the present invention.

For example, a floppy disk, a hard disk, an optical disk, a magnetooptical disk, a CD(compact-disc)-ROM(read-only memory), a magnetic tape, a nonvolatile memory card, a ROM or the like may be used as the storage medium storing the program codes.

The program codes also constitute the present invention not only when the functions of the above-described embodiments are realized by controlling the respective devices by the computer only in accordance with the supplied program codes, but also when the above-described embodiments are realized by cooperation of the program codes with an OS (operating system) operating in the computer, another application software, or the like.

The present invention may also be applied to a case in which, after storing the supplied program codes in a memory provided in a function expanding board of a computer or in a function expanding unit connected to the computer, a CPU or the like provided in the expanding board or the function expanding unit performs a part or the entirety of actual processing based on instructions of the program codes, and the functions of the above-described embodiments are realized by the processing.

As described above, according to the present invention, it is possible to change image data encoded using discrete wavelet transform into an optimum data arrangement which can be efficiently dealt with in each apparatus.

Particularly when dealing with image data encoded using discrete wavelet transform, it is possible to obtain image data having an optimum data arrangement in which the capacity of a memory provided in an apparatus dealing with the image data is taken into consideration. On the other hand, when dealing with image data encoded using discrete wavelet transform so as to be adapted to an apparatus having a small memory capacity, it is possible to arrange image data so as to easily perform various types of image processing in a desired two-dimensional region.

The individual components designated by blocks in the drawings are all well known in the image processing apparatus and method arts, and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   input means for inputting first entropy encoded data corresponding to an image, the first entropy encoded data comprising data produced by entropy encoding a first set of transform coefficients obtained by performing wavelet transform of the image in units of a first type;
   arrangement changing means for entropy decoding the first entropy encoded data to obtain the first set of transform coefficients, and for changing the first set of transform coefficients into a second set of transform coefficients corresponding to the result of performing wavelet transform of the image in units of a second type; and
   entropy encoding means for generating second entropy encoded data by entropy encoding the second set of the transform coefficients.

2. An apparatus according to claim 1, wherein the first type of unit comprises a predetermined number of lines, and wherein the second type of unit comprises one block having a size smaller than one picture frame in two dimensions.

3. An apparatus according to claim 2, wherein the first type of unit comprises one line.

4. An apparatus according to claim 1, wherein the first type of unit comprises a block having a size smaller than one picture frame in dimensions, and wherein the second type of unit comprises a predetermined number of lines.

5. An apparatus accoring to claim 4, wherein the second type of unit comprises one line.

6. An apparatus according to claim 1, wherein the entropy encoding comprises arithmetic encoding.

7. An apparatus according to claim 1, wherein said input means inputs the first entropy encoded data from an external apparatus, and wherein said arrangement changing means determines whether or not to decode the first entropy encoded data and to change the first set of transform coefficients, in accordance with a capacity of a buffer memory required during an encoding operation of the external apparatus.

8. An apparatus according to claim 1, further comprising output means for outputting the second entropy encoded data to an external apparatus, and
   wherein said arrangement changing means determines whether or not to decode the first entropy encoded data and to change the first set of transform coefficients, in accordance with a capacity of a buffer memory required during a decoding operation of the external apparatus.

9. An apparatus according to claim 1, wherein said arrangement changing means determines whether or not to decode the first entropy encoded data and to change the first set of transform coefficients, in accordance with input of a predetermined instruction.

10. An apparatus according to claim 9, wherein said input means inputs the first entropy encoded data from an external apparatus, and wherein the predetermined instruction is input from the external apparatus.

11. An apparatus according to claim 9, further comprising output means for outputting the second entropy encoded data to an external apparatus, and
    wherein the predetermined instruction is input from the external apparatus.

12. An apparatus according to claim 9, wherein the predetermined instruction is provided according to a manual operation from the user.

13. An apparatus according to claim 1, further comprising means for obtaining the first entropy encoded data by performing wavelet transform of the image in units of a first type to obtain the first set of transform coefficients and then entropy encoding the first set of transform coefficients.

14. An apparatus according to claim 1, further comprising an additional arrangement changing means for performing entropy decoding of the second entropy encoded data to obtain the second set of transform coefficients, and for changing the second set of transform coefficients into a third set of transform coefficients corresponding to the result of performing wavelet transform of the image in units of a third type, and
    Additional entropy encoding means for generating third entropy encoded data by entropy encoding the third set of transform coefficients.

15. An apparatus according to claim 14, wherein said arrangement changing means determines whether or not to decode the first entropy encoded data and to change the first set of transform coefficients, in accordance with a signal input from an external apparatus.

16. An apparatus according to claim 15, further comprising output means for outputting the third entropy encoded data to an external apparatus, and
    wherein said additional arrangement changing means determines whether or not to decode the second entropy encoded data and to change the second set of transform coefficients, in accordance with a signal input from the additional external apparatus.

17. An apparatus according to claim 16, wherein the third type of unit is the same as the first type of unit.

18. An image processing method comprising:
    an input step of inputting first entropy encoded data corresponding to an image, the first entropy encoded data comprising data produced by entropy encoding a first set of transform coefficients obtained by performing wavelet transform of the image in units of a first type;

an arrangement changing step of entropy decoding the first entropy encoded data to obtain the first set of transform coefficients, and of changing the first set of transform coefficients into a second set of transform coefficients corresponding to the result of performing wavelet transform of the image in units of a second type; and an entropy encoding step of generating second entropy encoded data by entropy encoding the second set of transform coefficients.

19. An image processing method according to claim 18, wherein the first entropy encoded data is input in said input step from an external apparatus, and wherein it is determined in said arrangement changing step whether or not to decode the first entropy encoded data and to change the first set of transform coefficients, in accordance with a capacity of a buffer memory required during an encoding operation of the external apparatus.

20. An image processing method according to claim 18, further comprising an output step of outputting the second entropy encoded data to an external apparatus, and wherein it is determined in said arrangement changing step whether or not to decode the first entropy encoded data and to change the first set of transform coefficients, in accordance with a capacity of a buffer memory required during a decoding operation of the external apparatus.

21. An image processing method according to claim 18, wherein it is determined in said arrangement changing step whether or not to decode the first entropy encoded data and to change the first set of transform coefficients, in accordance with input of a predetermined instruction.

22. An image processing method according to claim 18, further comprising an obtaining step of obtaining the first entropy encoded data by performing wavelet transform of the image in units of a first type to obtain the first set of transform coefficients and then entropy encoding the first set of transform coefficients.

23. A storage medium storing an image processing program in a state of being readable by a computer, said program comprising:

an input step of inputting first entropy encoded data corresponding to an image, the first entropy encoded data comprising data produced by entropy encoding a first set of transform coefficients obtained by performing wavelet transform of the image in units of a first type;

an arrangement changing step of entropy decoding the first entropy encoded data to obtain the first set of transform oefficients, and of changing the first set of transform coefficients into a second set of transform coefficients corresponding to the result of performing wavelet transform of the image in units of a second type; and an entropy encoding step of generating second entropy encoded data by entropy encoding the second set of transform coefficients.

24. A storage medium according to claim 23, wherein in said program the first entropy encoded data is input in said input step from an external apparatus, and wherein in said program it is determined in said arrangement changing step whether or not to decode the first entropy encoded data and to change the first set of transform coefficients, in accordance with a capacity of a buffer memory required during an encoding operation of the external apparatus.

25. A storage medium according to claim 23, said program further comprising an output step of outputting the second entropy encoded data to an external apparatus, and wherein in said program it is determined in said arrangement changing step whether or not to decode the first entropy encoded data and to change the first set of transform coefficients, in accordance with a capacity of a buffer memory required during a decoding operation of the external apparatus.

26. A storage medium according to claim 23, wherein in said program it is determined in said arrangement changing step whether or not to decode the first entropy encoded data and to change the first set of transform coefficients, in accordance with input of a predetermined instruction.

27. A storage medium according to claim 23, said program further comprising an obtaining step of obtaining the first entropy encoded data by performing wavelet transform of the image in units of a first type to obtain the first set of transform coefficients and then entropy encoding the first set of transform coefficients.

28. An image processing apparatus comprising:

input means for inputting first entropy encoded data corresponding to an image, the first entropy encoded data comprising data produced by entropy encoding a first set of transform coefficients obtained by performing wavelet transform of the image in a first pixel order;

arrangement changing means for entropy decoding the first entropy encoded data to obtain the first set of transform coefficients, and for changing the first set of transform coefficients into a second set of transform coefficients corresponding to the result of performing wavelet transform of the image in a second pixel order; and entropy encoding means for generating second entropy encoded data by entropy encoding the second set of transform coefficients.

29. An apparatus according to claim 28, wherein said input means inputs the first entropy encoded data from an external apparatus, and wherein said arrangement changing means determines whether or not to decode the first entropy encoded data and to change the first set of transform coefficients, in accordance with a capacity of a buffer memory required during an encoding operation of the external apparatus.

30. An apparatus according to claim 28, further comprising output means for outputting the second entropy encoded data to an external apparatus, and wherein said arrangement changing means determines whether or not to decode the first entropy encoded data and to change the first set of transform coefficients, in accordance with a capacity of a buffer memory required during a decoding operation of the external apparatus.

31. An apparatus according to claim 28, wherein said arrangement changing means determines whether or not to decode the first entropy encoded data and to change the first set of transform coefficients, in accordance with input of a predetermined instruction.

32. An apparatus according to claim 28, further comprising means for obtaining the first entropy encoded data by performing wavelet transform of the image in a first pixel order to obtain the first set of transform coefficients and then entropy encoding the first set of transform coefficients.

33. An image processing method comprising:

an input step of inputting first entropy encoded data corresponding to an image, the first entropy encoded data comprising data produced by entropy encoding a first set of transform coefficients obtained by performing wavelet transform of the image in a first pixel order;

an arrangement changing step of entropy decoding the first entropy encoded data to obtain the first set of transform coefficients, and of changing the first set of transform coefficients into a second set of transform coefficients corresponding to the result of performing wavelet transform of the image in a second pixel order; and an entropy encoding step of generating second entropy encoded data by entropy encoding of the second set of transform coefficients.

34. An image processing method according to claim 33, wherein the first entropy encoded data is input in said input step from an external apparatus, and wherein it is determined in said arrangement changing step whether or not to decode the first entropy encoded data and to change the first set of transform coefficients, in accordance with a capacity of a buffer memory required during an encoding operation of the external apparatus.

35. An image processing method according to claim 33, further comprising an output step of outputting the second entropy encoded data to an external apparatus, and wherein it is determined in said arrangement changing step whether or not to decode the first entropy encoded data and to change the first set of transform coefficients, in accordance with a capacity of a buffer memory required during a decoding operation of the external apparatus.

36. An image processing method according to claim 33, wherein it is determined in said arrangement changing step whether or not to decode the first entropy encoded data and to change the first set of transform coefficients, in accordance with input of a predetermined instruction.

37. An image processing method according to claim 33, further comprising an obtaining step of obtaining the first entropy encoded data by performing wavelet transform of the image in a first pixel order to obtain the first set of transform coefficients and then entropy encoding the first set of transform coefficients.

38. A storage medium storing an image processing program in a state of being readable by a computer, said program comprising:

an input step of inputting first entropy encoded data corresponding to an image, the first entropy encoded data comprising data produced by entropy encoding a first set of transform coefficients obtained by performing wavelet transform of the image in a first pixel order;

an arrangement changing step of entropy decoding the first entropy encoded data to obtain the first set of transform coefficients, and of changing the first set of transform coefficients into a second set of transform coefficients corresponding to the result of performing wavelet transform of the image in a second pixel order; and an entropy encoding step of generating second entropy encoded data by entropy encoding the second set of transform coefficients.

39. A storage medium according to claim 38, wherein in said program the first entropy encoded data is input in said input step from an external apparatus, and wherein in said program it is determined in said arrangement changing step whether or not to decode the first entropy encoded data and to change the first set of transform coefficients, in accordance with a capacity of a buffer memory required during an encoding operation of the external apparatus.

40. A storage medium according to claim 38, said program further comprising an output step of outputting the second entropy encoded data to an external apparatus, and wherein in said program it is determined in said arrangement changing step whether or not to decode the first entropy encoded data and to change the first set of transform coefficients, in accordance with a capacity of a buffer memory required during a decoding operation of the external apparatus.

41. A storage medium according to claim 38, wherein in said program it is determined in said arrangement changing step whether or not to decode the first entropy encoded data and to change the first set of transform coefficients, in accordance with input of a predetermined instruction.

42. A storage medium according to claim 38, said program further comprising an obtaining step of obtaining the first entropy encoded data by performing wavelet transform of the image in a first pixel order to obtain the first set of transform coefficients and then entropy encoding the first set of transform coefficients.

* * * * *

UNITED STATES PATENT AND TRADEMARK OFFICE
CERTIFICATE OF CORRECTION

PATENT NO. : 6,560,369 B1
DATED : May 6, 2003
INVENTOR(S) : Makoto Sato

It is certified that error appears in the above-identified patent and that said Letters Patent is hereby corrected as shown below:

Column 3,
Line 10, "of" (second occurrence) should be deleted.

Column 9,
Line 23, "#1-#S" should read -- #1 - #S --.

Column 11,
Line 26, "endoded" should read -- encoded --.

Column 16,
Line 60, "the" should read -- an --.

Column 17,
Line 53, "oefficients," should read -- coefficients, --.

Signed and Sealed this

Eleventh Day of November, 2003

JAMES E. ROGAN
*Director of the United States Patent and Trademark Office*